US010386565B2

(12) United States Patent
Chen et al.

(10) Patent No.: US 10,386,565 B2
(45) Date of Patent: Aug. 20, 2019

(54) SURFACE LIGHT SOURCE ASSEMBLY HAVING LIGHT GUIDE WITH GROOVE STRUCTURES FOR OUT-COUPLING LIGHT, AND BACKLIGHT MODULE HAVING THE SURFACE LIGHT SOURCE ASSEMBLY

(71) Applicant: Coretronic Corporation, Hsin-Chu (TW)

(72) Inventors: Hua Chen, Hsin-Chu (TW); Chun-Hsiang Hsu, Hsin-Chu (TW); Wei-Ching Wu, Hsin-Chu (TW); Fan-Chun Lin, Hsin-Chu (TW); Chung-Hung Fang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/881,462

(22) Filed: Jan. 26, 2018

(65) Prior Publication Data

US 2018/0239076 A1 Aug. 23, 2018

(30) Foreign Application Priority Data

Feb. 21, 2017 (CN) .......................... 2017 1 0092460

(51) Int. Cl.
*F21V 5/02* (2006.01)
*G02B 6/10* (2006.01)
*F21V 8/00* (2006.01)

(52) U.S. Cl.
CPC ........... *G02B 6/0038* (2013.01); *G02B 6/009* (2013.01); *G02B 6/0043* (2013.01); *G02B 6/0068* (2013.01)

(58) Field of Classification Search
CPC .. G02B 6/0011; G02B 6/0033; G02B 6/0035; G02B 6/0036; G02B 6/003; F21Y 2105/16; F21V 5/02
See application file for complete search history.

(56) References Cited

U.S. PATENT DOCUMENTS

| | | | | | |
|---|---|---|---|---|---|
| 3,241,256 | A | * | 3/1966 | Viret .................... | G01D 11/28 116/286 |
| 5,390,436 | A | * | 2/1995 | Ashall .................. | G02B 6/0043 362/618 |
| 7,654,687 | B2 | * | 2/2010 | Tsai ..................... | G02B 5/0247 257/98 |
| 7,722,241 | B2 | * | 5/2010 | Chang .................. | G02B 3/0056 362/612 |
| 7,806,580 | B2 | * | 10/2010 | Lin ......................... | F21K 9/00 362/235 |

(Continued)

FOREIGN PATENT DOCUMENTS

| | | |
|---|---|---|
| CN | 1993638 A | 7/2007 |
| TW | I359990 B | 3/2012 |
| TW | I522663 B | 2/2016 |

*Primary Examiner* — Ismael Negron (57) ABSTRACT

A backlight module includes a plurality of surface light source assembly. Each surface light source assembly includes a light source with a plurality of light emitting surfaces having a light emission angle range each; a light guide plate with a bottom surface having a groove for receiving the light source, a light exit surface opposite to the bottom surface, and at least one side surface between the bottom surface and the light exit surface; and a plurality of groove structures configured to reflect a portion of a light emitted from the light emitting surfaces to outside their light emission angle range.

17 Claims, 7 Drawing Sheets

(56) References Cited

U.S. PATENT DOCUMENTS

| | | | | |
|---|---|---|---|---|
| 7,909,496 B2* | 3/2011 | Matheson | ............ | G02B 6/0021 |
| | | | | 362/308 |
| 8,414,162 B2* | 4/2013 | Pijlman | ................ | G02B 6/0021 |
| | | | | 362/339 |
| 8,434,923 B2* | 5/2013 | Huang | .................. | G02B 6/0043 |
| | | | | 362/606 |
| 8,801,209 B2* | 8/2014 | Im | ..................... | G02F 1/133603 |
| | | | | 362/249.02 |
| 8,814,391 B2* | 8/2014 | Koh | .................... | G02B 6/0021 |
| | | | | 313/512 |
| 9,074,754 B2* | 7/2015 | Liao | ..................... | G02B 6/0035 |
| 9,164,218 B2* | 10/2015 | Shani | ..................... | G02B 5/021 |
| 9,366,396 B2* | 6/2016 | Yuan | ....................... | F21K 9/233 |

* cited by examiner

SURFACE LIGHT SOURCE ASSEMBLY HAVING LIGHT GUIDE WITH GROOVE STRUCTURES FOR OUT-COUPLING LIGHT, AND BACKLIGHT MODULE HAVING THE SURFACE LIGHT SOURCE ASSEMBLY

CROSS-REFERENCE TO RELATED APPLICATION

This application claims the priority benefit of China Application (CN201710092460.5 filed on 2017 Feb. 21). The entirety of the above-mentioned patent application is hereby incorporated by reference herein and made a part of this specification.

FIELD OF THE INVENTION

The invention relates to a light source module, and more particularly to a backlight module and its surface light source assembly.

BACKGROUND OF THE INVENTION

The liquid crystal display panel of the liquid crystal display device does not emit light, so that the backlight module is necessarily required to provide the surface light source. The backlight module includes a direct-type backlight module and a side-type backlight module. In a common side-type backlight module, the light emitting diode bar is disposed on the side of the light guide plate, dots are disposed on the light guide plate, and the light provided by the light emitting diode bar is emitted from the light exit surface of the light guide plate by the dots after entering the light guide plate. However, since the light emitting diode light bar is disposed on the side of the light guide plate, some problems such as having uneven luminance may occur and it is not advantageous for local dimming.

In a common direct-type backlight module, a plurality of light emitting diodes arranged as a two-dimensional array are arranged below the diffusion plate. In order to reduce the number of light emitting diodes, a secondary lens corresponding to each of the light emitting diodes is disposed to increase the light emission angle of the light emitting diode. Compared with the side-type backlight module, the direct-type backlight module has better luminance uniformity and is advantageous for local dimming, but has a problem of thicker thickness.

The conventional technology also developed the mix-type backlight module, which mainly use a plurality of light guide plate to replace the secondary lens employed in the direct-type backlight module to reduce the overall thickness of the mix-type backlight module. However, the corners of each of the light guide plates may have obvious dark areas, so that the conventional mix-type backlight module has a problem of uneven luminance.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a surface light source assembly that can be applied to a backlight module to improve the problem of uneven luminance in the conventional mix-type backlight module.

The invention provides a backlight module to improve the problem of uneven luminance in the conventional mix-type backlight module.

Other objectives and advantages of the invention may be further illustrated by the technical features disclosed in the invention.

In order to achieve one or a portion of or all of the objectives or other objectives, an embodiment of the invention provides a surface light source assembly, which includes a light source and a light guide plate. The light source has a plurality of light emitting surfaces, and each of the light emitting surfaces has a light emission angle range. The light guide plate has a bottom surface, a light exit surface opposite to the bottom surface, and at least one side surface connected between the bottom surface and the light exit surface. The bottom surface has an accommodation groove for accommodating the light source. The light emitting surfaces face the at least one side surface. The light guide plate further has a plurality of groove structures located within the light emission angle range of the light emitting surfaces to reflect a portion of a light emitted from the light emitting surfaces to outside the light emission angle range.

In order to achieve one or a portion of or all of the objectives or other objectives, an embodiment of the invention provides a backlight module, which includes a plurality of the aforementioned surface light source assemblies. The light guide plates of the surface light source assemblies are integrally formed.

In summary, due to the light guide plate has a plurality of groove structures capable of reflecting a portion of the light emitted from the light emitting surface of the light source to outside the light emission angle range of the light emitting surface, the surface light source assembly of the embodiment of the invention can improve the problem of the corner dark area of the light guide plate of the conventional mix-type backlight module to enhance the luminous uniformity. The backlight module of the embodiment of the invention can provide a surface light source having better luminance uniformity by using a plurality of the surface light source assemblies described above.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
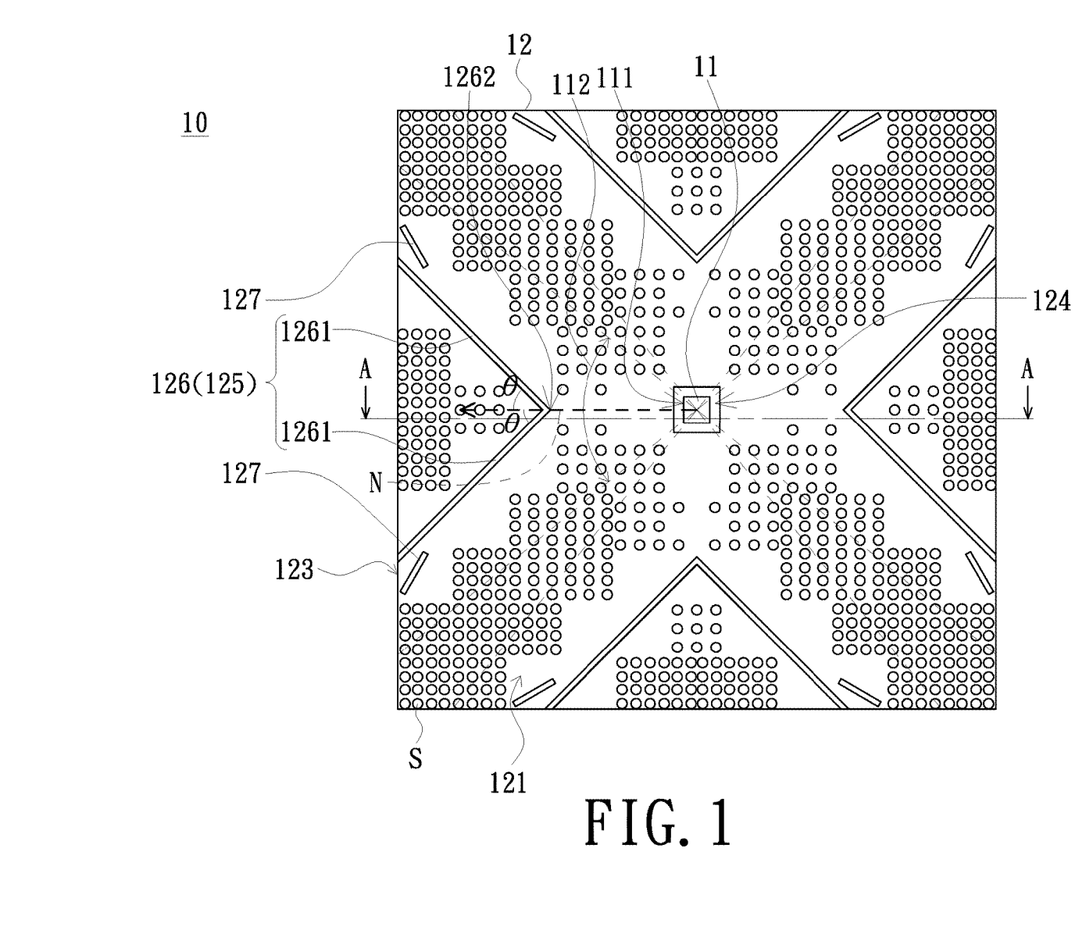
FIG. 1 is a schematic bottom view of a surface light source assembly in accordance with an embodiment of the invention.
Figure 2:
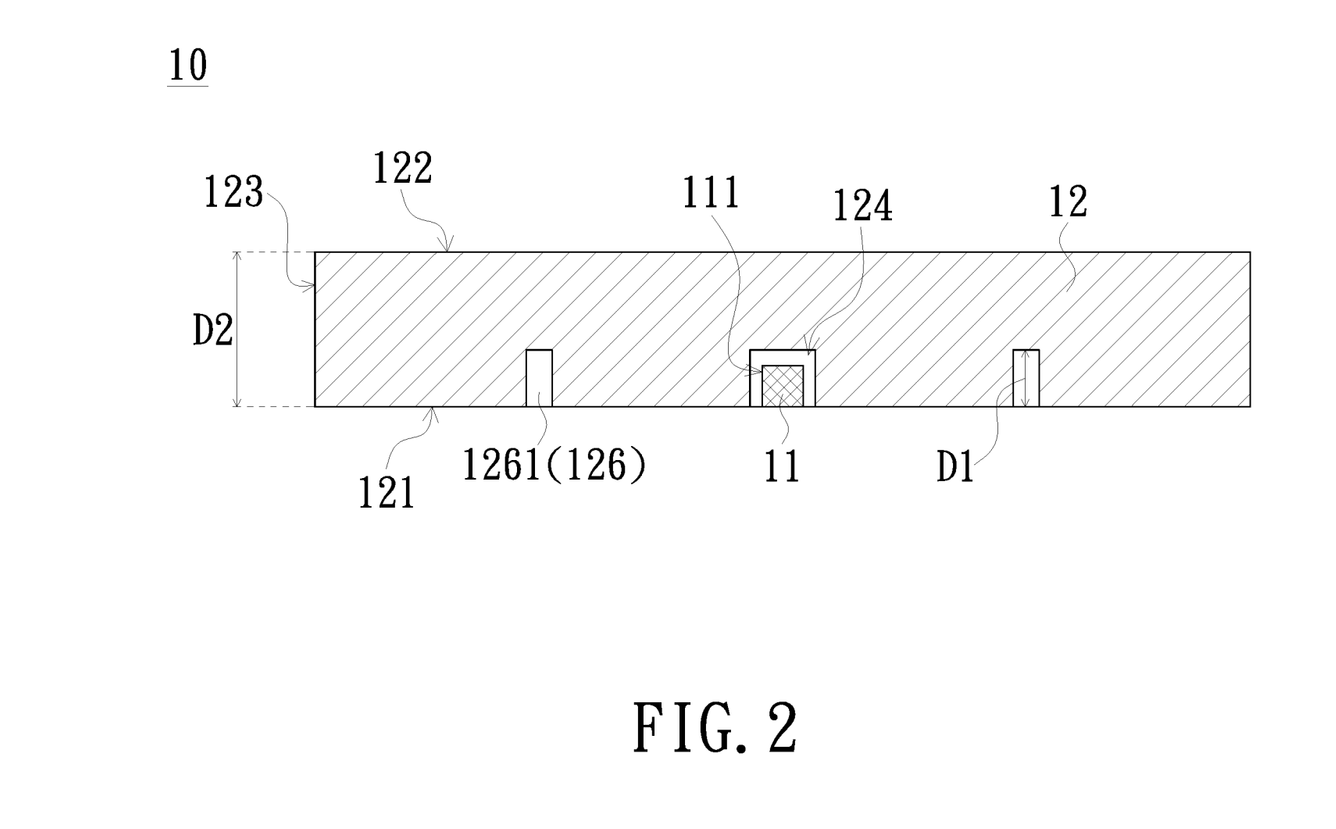
FIG. 2 is a schematic cross-sectional view taken along the line A-A in FIG. 1.

FIG. 1 is a schematic bottom view of a surface light source assembly in accordance with an embodiment of the invention. FIG. 2 is a schematic cross-sectional view taken along the line A-A in FIG. 1, but FIG. 2 omits the dotted microstructure S in FIG. 1. Referring to FIGS. 1 and 2. The surface light source assembly 10 of the embodiment includes a light source 11 and a light guide plate 12. The light source 11 has a plurality of light emitting surfaces 111, and each of the light emitting surfaces 111 has a light emission angle range 112. The light guide plate 12 has a bottom surfaces 121, a light exit surface 122 opposite to the bottom surface 121, and at least one side surface 123 connected between the bottom surface 121 and the light exit surface 122. The bottom surface 121 has an accommodation groove 124 for accommodating the light source 11. The light emitting surfaces 111 face the at least one side surface 123. The light guide plate 12 further has a plurality of groove structures 125 located within the light emission angle ranges 112 of the light emitting surfaces 111 to reflect a portion of the light emitted from the light emitting surfaces 111 to the outside of the light emission angle ranges 112.

The light source 11 of the embodiment includes, for example, one light emitting element. The light emitting element has, for example, a plurality of light emitting surfaces 111, and FIG. 1 is exemplified by having four light emitting surfaces 111. Specifically, the light emitting element is, for example, a light emitting diode having four light emitting side surfaces. Each of the light emitting surfaces 111 has an optical axis N, wherein the optical axis N is a normal line of the light emitting center point of each of the light emitting surfaces 111. In addition, the light emission angle range 112 is determined according to the light emission angle of the specification of the light emitting element itself; wherein the light emission angle refers to the half power angle, that is, the angle corresponding to the 50% of the luminous intensity. For example, the light emission angle range 112 is between ±60 degrees if the half power angle is ±60 degrees.

The light guide plate 12 of the embodiment has, for example, four side surfaces 123 connected between the bottom surface 121 and the light exit surface 122, but the invention does not limit the number of the side surfaces 123 of the light guide plate 12 and the specific shape of the light guide plate 12. For example, in the embodiment that the bottom surface and the light exit surface are circular, the light guide plate has a disc shape and has only one annular side surface. In the embodiment of FIG. 1, the light guide plate 12 is a square structure having four side surfaces 123, the light source 11 is a light emitting diode having four light emitting surfaces 111, and each of the light emitting surfaces 111 corresponds to a respective side surface 123 of the light guide plate 12. Since the light emission angle range 112 of each of the light emitting surfaces 111 is between ±30 degrees, each of the corners of the light guide plate 12 is located outside the light emission angle range 112 of each of the light emitting surfaces 111, so that corner dark areas are formed on the light guide plate 12.

In FIG. 1, the accommodation groove 124 is disposed at the center of the bottom surface 121 of the light guide plate 12 so that the light source 11 is located at the center of the bottom surface 121 of the light guide plate 12. However, the invention does not limit the position of the accommodation groove 124 at the bottom surface 121. That is, the accommodation groove 124 may be disposed at other suitable positions of the bottom surface 121 of the light guide plate 12 according to the design requirements, so that the light source 11 is not necessarily located at the center of the bottom surface 121 of the light guide plate 12.

The groove structure 125 of the embodiment is mainly used for reflecting a portion of the light emitted from the light emitting surfaces 111 to the dark area of the light guide plate 12. The groove structure 125 may be disposed on the bottom surface 121 or the light exit surface 122 of the light guide plate 12. FIG. 1 is exemplified by disposing the groove structure 125 on the bottom surface 121 of the light guide plate 12. A specific embodiment of the groove structure 125 will be described below, but the invention is not limited thereto.

The aforementioned groove structures 125 include, for example, a plurality of first groove structures 126. Each of the first groove structures 126 includes, for example, two first grooves 1261 disposed on two sides of the optical axis N of each of the light emitting surfaces 111 and extending from one end 1262 of each of the two first grooves 1261 adjacent to the optical axis N in a direction away from the light source 11 and the optical axis N. In addition, the ends 1262 of the two first grooves 1261 of each of the first groove structures 126 adjacent to the optical axis N are, for example, connected. The two connected first grooves 1261 each are, for example, a straight strip groove, so that each of the first groove structures 126 is V-shaped, but the invention does not limit the specific shape of each of the first grooves 1261. In other embodiments, each of the first grooves 1261 may be a curved groove or other suitable shaped groove. In addition, in another embodiment, the ends 1262 of the two first grooves 1261 of each of the first groove structures 126 adjacent to the optical axis N may not be connected so that light may pass through between the ends 1262 of the adjacent first grooves 1261. In addition, the first grooves 1261 are, for example, extended to a side of the at least one side surface 123. Taking FIG. 1 as an example. The first grooves 1261 of the different first groove structures 126 are extended and connected to the different side surfaces 123 of the light guide plate 12. However, the invention does not limit that the first groove 1261 of the first groove structure 126 is extended and connected to the side surface 123 of the light guide plate 12, that is, the first groove 1261 may not be connected to the side surface 123.

In the surface light source assembly 10 of the embodiment, since the groove structure 125 is disposed within the light emission angle range 112 of the light emitting surface 111, a portion of the light entering the light guide plate 12 is reflected by the groove structure 125 to the dark area outside the light emission angle range 112 (e.g., the corner dark area), and a portion of the light passes through the above of the groove structure 125 and is not reflected by the groove structure 125. Thus, light can be uniformly emitted from the light emitting surface 122, and the light emission uniformity of the light guide plate 12 can be improved.

An acute angle $\theta$ is, for example, formed between each of the first grooves 1261 and the optical axis N, and the angle of the acute angle $\theta$ can be designed according to different requirements. In one embodiment, the angle of the acute angle $\theta$ is, for example, between 10 degrees and 80 degrees (that is, the included angle between the two first grooves 1261 is between 20 degrees and 160 degrees), and preferably, is between 20 degrees to 70 degrees (that is, the included angle between the two first grooves 1261 is between 40 degrees and 140 degrees).

In addition, if the dark area still exists, other grooves may be disposed in the light guide plate 12 to reflect light to the dark area. For example, the light guide plate 12 may further include a plurality of edge grooves 127 disposed on two sides of each of the first groove structures 126 and adjacent to the at least one side surface 123 of the light guide plate 12. In FIG. 1, the edge grooves 127 disposed on two sides of the same first groove structure 126 are adjacent to the same side surface 123, and the edge grooves 127 disposed on two sides of the different first groove structures 126 are adjacent to the different side surfaces 123. Each of the edge grooves 127 may be a linear groove (as shown in FIG. 1), a curved groove or a groove having other suitable shapes. The edge groove 127 may be disposed within or outside the light emission angle range 112 of the corresponding light emitting surface 111 to reflect a portion of light to the dark area, thereby improving the light emission uniformity of the light guide plate 12. In addition, each of the edge grooves 127 is not parallel to the first groove 1261 on the side in FIG. 1; however, in other embodiments, each of the edge grooves 127 may be parallel to the first groove 1261 on the side.

The bottom surface 121 of the light guide plate 12 may be disposed with a plurality of dotted microstructures S for destroying the total reflection of the light in the light guide plate 12 so that the light can be emitted from the light exit surface 122. In order to further improve the light emission uniformity of the light guide plate 12, the distribution density of the dotted microstructures S can be gradually increased from the position adjacent to the light source 11 toward the direction away from the light source 11 and gradually increased from the position adjacent to of the groove structure 125 toward the direction away from the groove structure 125.

It is to be noted that the depth D1 of the groove structure 125 determines the proportion of light reflection. That is, the proportion of the light reflected by the groove structure 125 increases with the greater of the depth D1 of the groove structure 125, and the proportion of the light reflected by the groove structure 125 decreases with the less of the depth D1 of the groove structure 125. In the embodiment, the depth D1 of the same groove structure 125 is consistent for example, and the ratio of the depth D1 of the groove structure 125 and the thickness D2 of the light guide plate 12 can be adjusted according to the design requirements. In one embodiment, the depth D1 of the groove structure 125 is, for example, half of the thickness D2 of the light guide plate 12. In other embodiments, the depth D1 of the same groove structure 125 may be inconsistent, and the depth D1 of the groove structure 125 may be adjusted according to different design requirements. For example, the depth D1 of the groove structure 125 may be gradually increased from the position adjacent to the light source 11 toward the direction away from the light source 11. In addition, the depth of the same edge groove 127 may be consistent or inconsistent. In addition, the width of the same first groove 1261 or the same edge groove 127 may be consistent or inconsistent.

Figure 3:
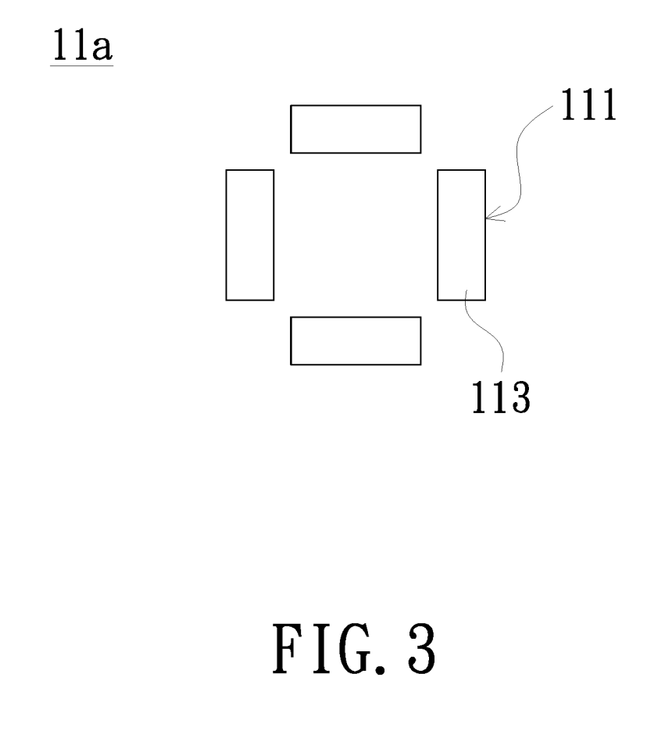
FIG. 3 is a schematic view of a light source of a surface light source assembly in accordance with another embodiment of the invention.

The light source 11 in FIG. 1 is exemplified by one light emitting element having a plurality of light emitting surfaces 111. However, in other embodiments, the light source may include a plurality of light emitting elements, and each of the light emitting elements may have one or more light emitting surfaces. For example, referring to FIG. 3, which is a schematic view of a light source of a surface light source assembly in accordance with another embodiment of the invention. In FIG. 3, the light source 11a includes four light emitting elements 113, and each of the light emitting elements 113 has one light emitting surface 111, wherein the four light emitting elements 113 are annularly arranged as a square frame in a manner that the light emitting surfaces 111 face outwardly. The light source 11a may be used to replace the light source 11 in FIG. 1.

Figure 4:
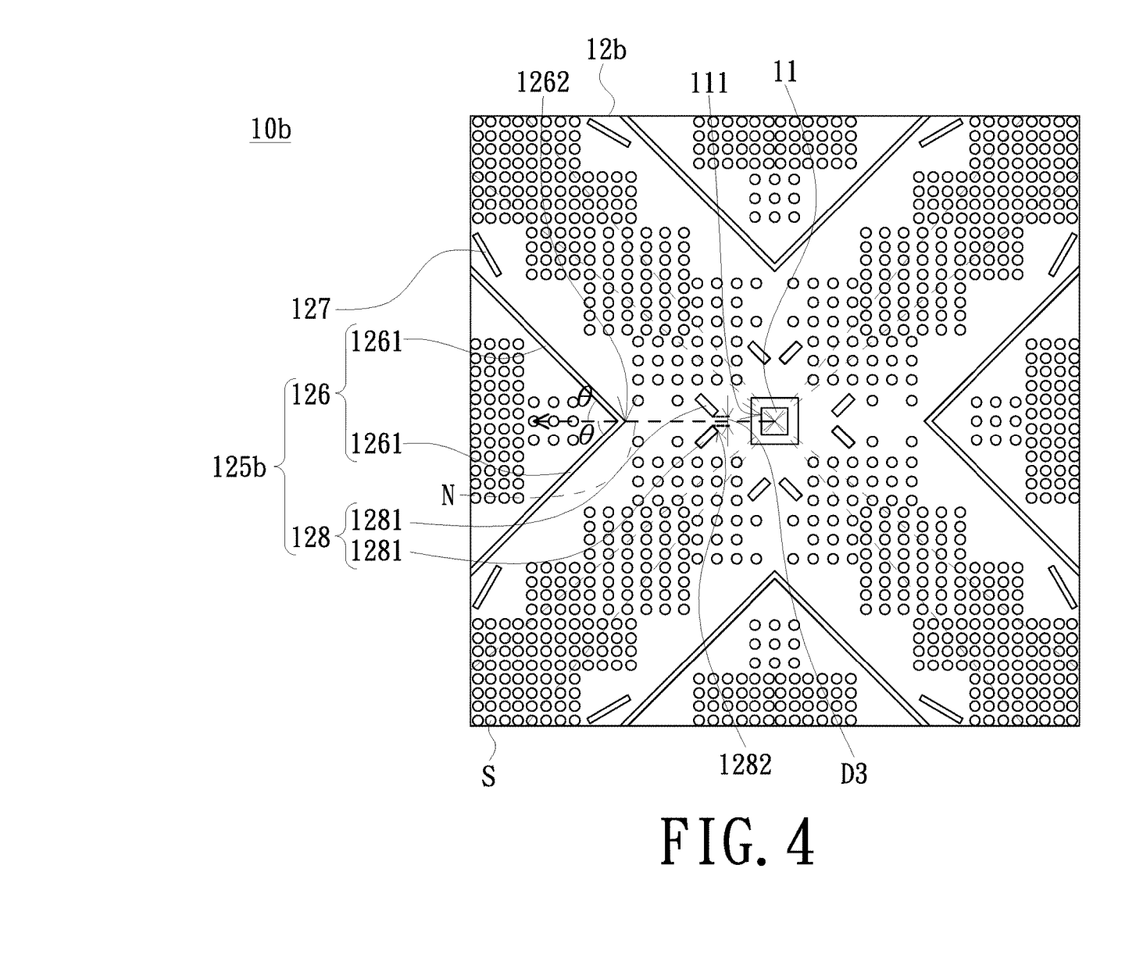
FIG. 4 is a schematic bottom view of a surface light source assembly in accordance with another embodiment of the invention.

FIG. 4 is a schematic bottom view of a surface light source assembly in accordance with another embodiment of the invention. Referring to FIG. 4. The surface light source assembly 10b of the embodiment is similar to the surface light source assembly 10 of FIG. 1, and the main difference is that the groove structure 125b of the light guide plate 12b of the present embodiment further includes, in addition to the aforementioned first groove structures 126, a plurality of second groove structures 128 respectively disposed between the first groove structures 126 and the light source 11. Each of the second groove structures 128 includes, for example, two second grooves 1281 respectively disposed on the two sides of the optical axis N of each of the light emitting surfaces 111 and extending from one end 1282 of each of the two second grooves 1281 adjacent to the optical axis N toward the direction away from the light source 11 and the optical axis N. The second groove 128 may also reflect a portion of the light provided by the light emitting surface 122 to the dark area outside the light emission angle range 112. The dark area improved by the second groove 128 may be a dark area cannot be improved by the first groove 1261, or a dark area cannot be greatly improved by the first groove 1261. In other words, the second groove 1281 may be used to assist the first groove 1261 to improve the dark area of the light guide plate 12b. In the embodiment, since the four side surfaces 123 of the light guide plate 12 have the same length to form a square structure, thereby avoiding that the length of each of the second grooves 1281 adjacent to the light source 11 is too large, which may lead to that the light passing through the above of the second groove 1281 is too less and accordingly the dark area is formed between the second grove 1281 and the first groove 1261. Thus, the length of each of the first grooves 1261 is, for example, greater than the length of each of the second grooves 1281. However, in other embodiments, the light guide plate 12 has a rectangular structure for example. The distance between the side surface of the longer side of the light guide plate 12 and the light source is relatively short, therefore, the distance between the second grooves 1281 and the first grooves 1261 is relatively small, and the length of each of the second grooves 1281 causes the dark area between the second groove 1281 and the first groove 1261 has a less impact; thus, the length of the first groove 1261 adjacent to the side surface of the longer side of the light guide plate 12 may be equal to or smaller than that of the second groove 1281. According to the above description, it is known that the length of the first groove 1261 and the length of the second groove 1281 may have a plurality of variations according to different designs, and the invention is not limited thereto. In addition, the second groove 1281 may be a linear groove (as shown in FIG. 4), a curved groove or a groove having other suitable shapes. In addition, a gap D3 may be formed between the ends 1282 of the two second grooves 1281 of each of the second groove structures 128 of the embodiment; however the two ends 1282 may be connected to each other according to the design requirements. In addition, the light guide plate 12b of the embodiment may also include the edge grooves 127 in FIG. 1. The invention does not limit the length of the first groove 1261 and the length of the second groove 1281.

Figure 5:
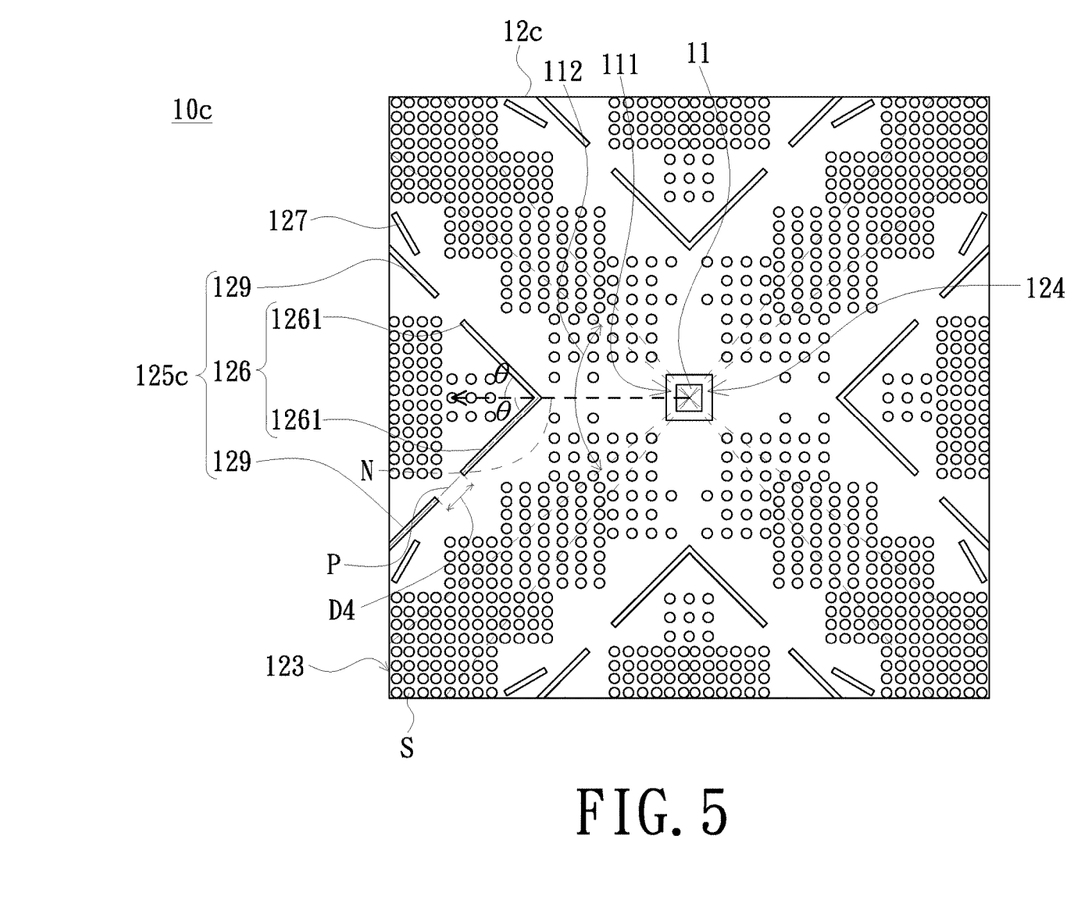
FIG. 5 is a schematic bottom view of a surface light source assembly in accordance with another embodiment of the invention.

FIG. 5 is a schematic bottom view of a surface light source assembly in accordance with another embodiment of the invention. Referring to FIG. 5. The surface light source assembly 10c of the embodiment is similar to the surface light source assembly 10 of FIG. 1, and the main difference is that the plurality of groove structures 125c of the light guide plate 12c of the embodiment further include, in addition to the first groove structure 126, a plurality of extension grooves 129 respectively disposed on the extension paths P of the first grooves 1261 and adjacent to the at least one side surface 123 of the light guide plate 12c, wherein there is a gap D4 between the extension groove 129 and the first groove 1261 on the same extension path P. In the embodiment, each of the first grooves 1261 does not extend to the side surface 123 of the light guide plate 12c, and the extension groove 129 corresponding to each of the first grooves 1261 extends to the adjacent side surface 123 of the light guide plate 12c and may be connected or not connected to the side surface 123. The disposition and the length of the gap D4 can be adjusted according to different requirements. In addition, the groove structures 125c of the light guide plate 12c of the embodiment may also include the second groove structures 128 in FIG. 4 and the edge grooves 127 in FIG. 1.

Figure 6:
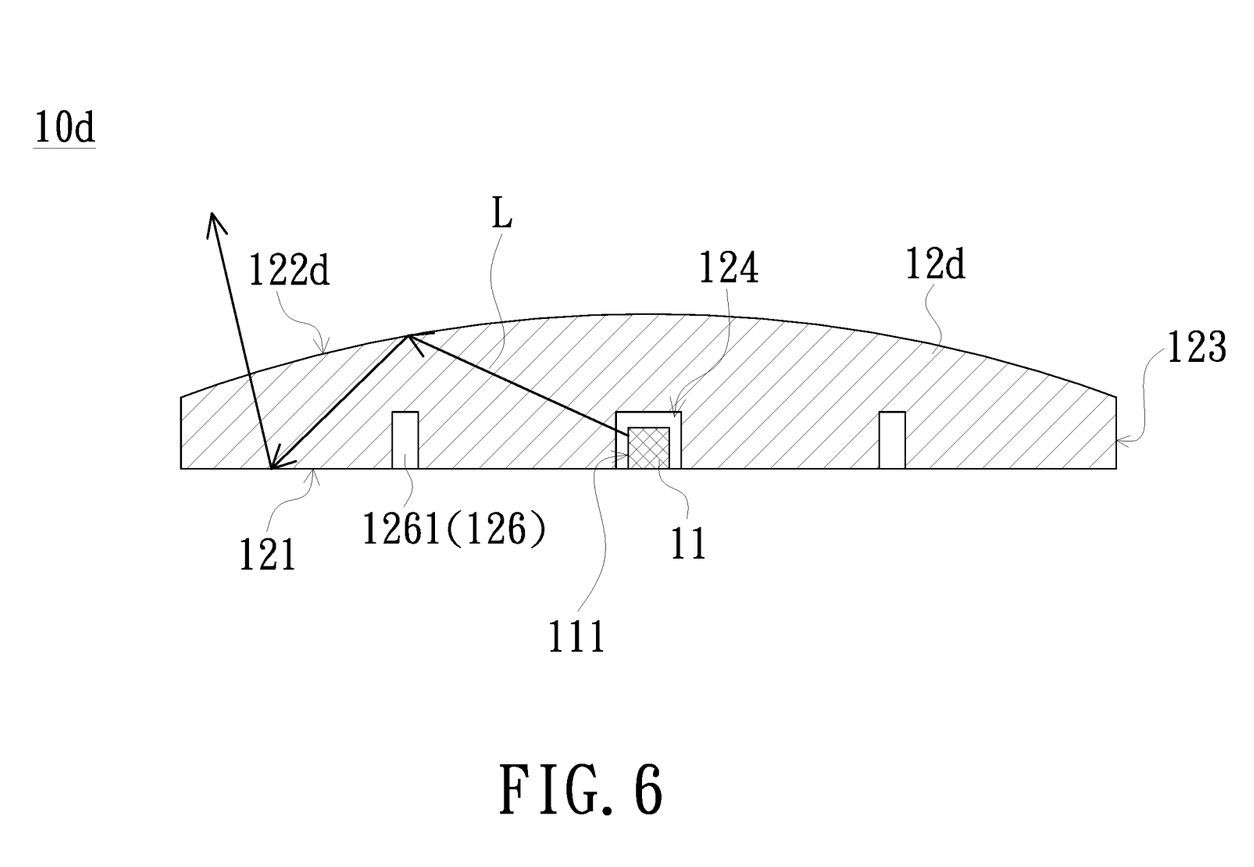
FIG. 6 is a schematic cross-sectional view of a surface light source assembly in accordance with another embodiment of the invention.

FIG. 6 is a schematic cross-sectional view of a surface light source assembly in accordance with another embodiment of the invention, wherein FIG. 6 also omits the dotted microstructures. As shown in FIG. 6, the surface light source assembly 10d of the embodiment is similar to the surface light source assembly 10 of FIG. 2, and the main difference is that the light exit surface 122d of the light guide plate 12d of the embodiment is, for example, a convex surface. The height of the light exit surface 122d is, for example, gradually decreased from the center toward the side surface 123. The convex surface may be a curved surface or may include a plurality of bevels inclined from the center toward the side surface 123. The incident angle of the light in the light guide plate 12d on the light emitting surface 122d can be changed by designing the light emitting surface 122d as a convex surface, so that the light originally reflected to the side surface 123 of the light guide plate 12d and leaked from the side surface 123 (for example, light L) is reflected to the bottom surface 121 of the light guide plate 12d and is reflected by the dotted microstructures (not shown) on the bottom surface 121 to exit from the light exit surface 122d. Thus, the problem of light leakage at the edge of the light guide plate can be improved. In addition, the light exit surface of the light guide plate of any one of the above embodiments may be disposed as a convex surface.

Figure 7:
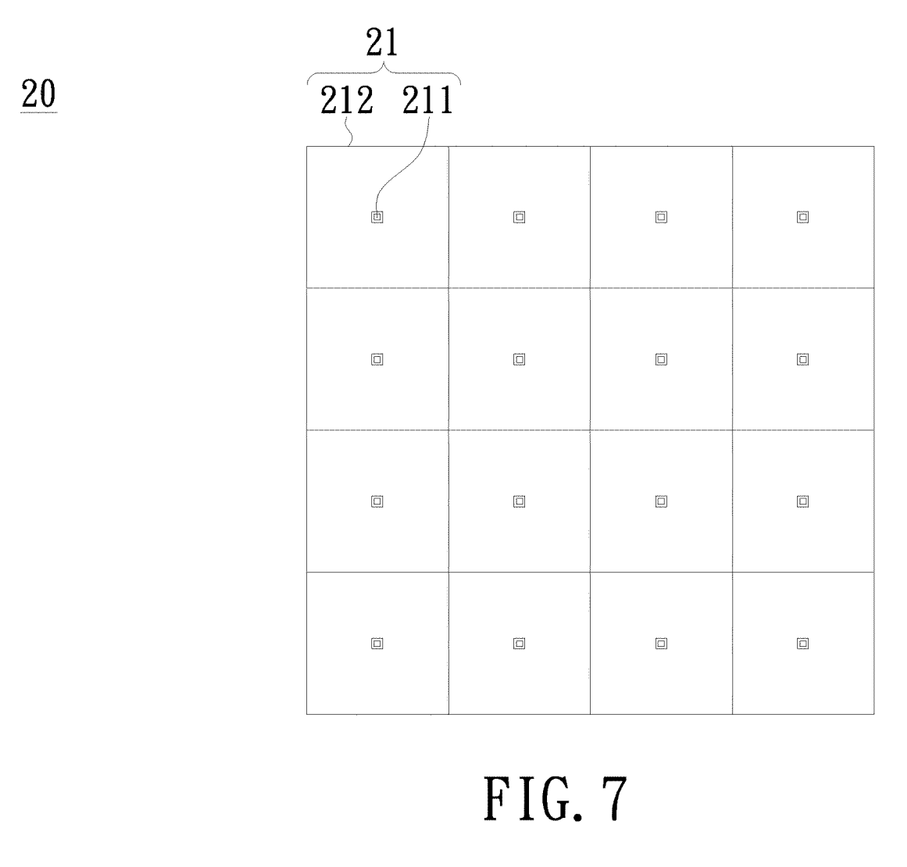
FIG. 7 is a schematic view of a backlight module in accordance with an embodiment of the invention.

FIG. 7 is a schematic view of a backlight module in accordance with an embodiment of the invention. As shown in FIG. 7, the backlight module 20 of the embodiment includes a plurality of surface light source assemblies 21, each of the surface light source assemblies 21 includes a light source 211 and a light guide plate 212, and the light guide plates 212 of the surface light source assemblies 21 are integrally formed. The surface light source assembly 21 may the surface light source assembly of any of the embodiments described above, such as the surface light source assembly 10, 10b, 10c or 10d. Since the backlight module 20 employs the surface light source assembly of any of the embodiments described above, a surface light source having better luminance uniformity is provided.

In summary, due to the light guide plate has a plurality of groove structures capable of reflecting a portion of the light emitted from the light emitting surface of the light source to outside the light emission angle range of the light emitting surface, the surface light source assembly of the embodiment of the invention can improve the problem of the corner dark area of the light guide plate of the conventional mix-type backlight module to enhance the luminous uniformity. The backlight module of the embodiment of the invention can provide a surface light source having better luminance uniformity by using a plurality of the surface light source assemblies described above.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first prism sheet, the second prism sheet, the third prism sheet, the first microstructures, the second microstructures, the first prism units, the second prism units, the third prism units, the first substrate, the second substrate, the third substrate, the first surface, the second surface, the third surface, the fourth surface, the first inclined surface, the second inclined surface, the third inclined surface, the fourth inclined surface, the first direction, the second direction, the third direction, the first angle, the second angle, the third angle, the fourth angle, the fifth angle, the sixth angle, the first vertex angle and the second vertex angle are only used for distinguishing various elements and do not limit the number of the elements.

What is claimed is:

1. A surface light source assembly, comprising:
   a light source, having a plurality of light emitting surfaces, wherein each of the light emitting surfaces has a light emission angle range; and
   a light guide plate, having a bottom surface with an accommodating groove, a light exit surface opposite to the bottom surface, at least one side surface between the bottom surface and the light exit surface, and a plurality of groove structures;
   wherein the light source is received in the accommodation groove such that the light emitting surfaces face the at least one side surface, and the groove structures reflect at least a portion of a light emitted from the light emitting surfaces to a direction outside the light emission angle range;
   each of the light emitting surfaces has an optical axis, the groove structures comprise a plurality of first groove structures, each of the first groove structures comprises two first grooves disposed on two sides of the optical axis of each of the light emitting surfaces and extending from an end of each of the two first grooves adjacent to the optical axis toward a direction away from the light source and the optical axis; and
   an acute angle between each of the first grooves and the optical axis is between 10 degrees and 80 degrees.

2. The surface light source assembly according to claim 1, wherein the groove structures are disposed on the bottom surface of the light guide plate.

3. The surface light source assembly according to claim 1, wherein the groove structures are disposed on the light exit surface of the light guide plate.

4. The surface light source assembly according to claim 1, wherein the ends of the two first grooves of each of the first groove structures adjacent to the optical axis are connected.

5. The surface light source assembly according to claim 1, wherein the acute angle between each of the first grooves and the optical axis is between 20 degrees and 70 degrees.

6. The surface light source assembly according to claim 1, wherein the groove structures further comprise a plurality of second groove structures disposed between each of the first groove structures and the light source respectively, each of the second groove structures comprises two second grooves disposed on two sides of the optical axis of each of the light emitting surfaces and extending from an end of each of the two second grooves adjacent to the optical axis toward a direction away from the light source and the optical axis.

7. The surface light source assembly according to claim 1, wherein the first grooves extend to a side of the at least one side surface.

8. The surface light source assembly according to claim 1, wherein the light source comprises a light emitting element having the light emitting surfaces.

9. The surface light source assembly according to claim 1, wherein the light source comprises a plurality of light emitting elements, and each of the light emitting elements has one of the light emitting surfaces.

10. The surface light source assembly according to claim 1, wherein a depth of at least one of the groove structures is not constant.

11. The surface light source assembly according to claim 1, wherein the light exit surface of the light guide plate is a convex surface.

12. A backlight module, comprising a plurality of the surface light source assemblies as claimed in claim 1, wherein the light guide plates of the surface light source assemblies are integrally formed.

13. A surface light source assembly, comprising:
   a light source, having a plurality of light emitting surfaces, wherein each of the light emitting surfaces has a light emission angle range; and
   a light guide plate, having a bottom surface with an accommodating groove, a light exit surface opposite to the bottom surface, at least one side surface between the bottom surface and the light exit surface, and a plurality of groove structures;
   wherein the light source is received in the accommodation groove such that the light emitting surfaces face the at least one side surface, and the groove structures reflect at least a portion of a light emitted from the light emitting surfaces to a direction outside the light emission angle range;
   each of the light emitting surfaces has an optical axis, the groove structures comprise a plurality of first groove structures, each of the first groove structures comprises two first grooves disposed on two sides of the optical axis of each of the light emitting surfaces and extending from an end of each of the two first grooves adjacent to the optical axis toward a direction away from the light source and the optical axis;

the groove structures further comprise a plurality of second groove structures disposed between each of the first groove structures and the light source respectively, each of the second groove structures comprises two second grooves disposed on two sides of the optical axis of each of the light emitting surfaces and extending from an end of each of the two second grooves adjacent to the optical axis toward a direction away from the light source and the optical axis; and a length of each of the first grooves is greater than a length of each of the second grooves.

14. The surface light source assembly according to claim 13, wherein there is a gap between the ends of the two second grooves of each of the second groove structures adjacent to the optical axis.

15. A surface light source assembly, comprising:

a light source, having a plurality of light emitting surfaces, wherein each of the light emitting surfaces has a light emission angle range; and a light guide plate, having a bottom surface with an accommodating groove, a light exit surface opposite to the bottom surface, at least one side surface between the bottom surface and the light exit surface, and a plurality of groove structures, wherein the light source is received in the accommodation groove such that the light emitting surfaces face the at least one side surface, and the groove structures reflect at least a portion of a light emitted from the light emitting surfaces to a direction outside the light emission angle range;

each of the light emitting surfaces has an optical axis, the groove structures comprise a plurality of first groove structures, each of the first groove structures comprises two first grooves disposed on two sides of the optical axis of each of the light emitting surfaces and extending from an end of each of the two first grooves adjacent to the optical axis toward a direction away from the light source and the optical axis; and the groove structures further comprise a plurality of extension grooves disposed on an extension path of each of the first grooves and adjacent to the at least one side surface of the light guide plate respectively, and there is a gap between the extension groove and the first groove on the same extension path.

16. A surface light source assembly, comprising:

a light source, having a plurality of light emitting surfaces, wherein each of the light emitting surfaces has a light emission angle range; and a light guide plate, having a bottom surface with an accommodating groove, a light exit surface opposite to the bottom surface, at least one side surface between the bottom surface and the light exit surface, and a plurality of groove structures, wherein the light source is received in the accommodation groove such that the light emitting surfaces face the at least one side surface, and the groove structures reflect at least a portion of a light emitted from the light emitting surfaces to a direction outside the light emission angle range;

each of the light emitting surfaces has an optical axis, the groove structures comprise a plurality of first groove structures, each of the first groove structures comprises two first grooves disposed on two sides of the optical axis of each of the light emitting surfaces and extending from an end of each of the two first grooves adjacent to the optical axis toward a direction away from the light source and the optical axis; and the light guide plate further comprises a plurality of edge grooves disposed on two sides of each of the first groove structures and adjacent to the at least one side surface of the light guide plate.

17. A surface light source assembly, comprising:

a light source, having a plurality of light emitting surfaces, wherein each of the light emitting surfaces has a light emission angle range; and a light guide plate, having a bottom surface with an accommodating groove, a light exit surface opposite to the bottom surface, at least one side surface between the bottom surface and the light exit surface, and a plurality of groove structures, wherein the light source is received in the accommodation groove such that the light emitting surfaces face the at least one side surface, and the groove structures reflect at least a portion of a light emitted from the light emitting surfaces to a direction outside the light emission angle range; and the bottom surface of the light guide plate is disposed with a plurality of dotted microstructures, a distribution density of the dotted microstructures is gradually increased from a position adjacent to the light source toward a direction away from the light source and is gradually increased from a position adjacent to the groove structures toward a direction away from the groove structures.

* * * * *